United States Patent
Lin et al.

(10) Patent No.: US 8,325,388 B2
(45) Date of Patent: Dec. 4, 2012

(54) SYSTEM AND METHOD FOR EMBEDDING INFORMATION IN A PRINTED MEDIA

(75) Inventors: I-Jong Lin, Half Moon Bay, CA (US); Paul F. Matheson, San Bruno, CA (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 12/475,442

(22) Filed: May 29, 2009

(65) Prior Publication Data

US 2010/0302600 A1    Dec. 2, 2010

(51) Int. Cl.
*H04N 1/40* (2006.01)
*G06K 15/00* (2006.01)
(52) U.S. Cl. ..................... 358/3.28; 358/1.18
(58) Field of Classification Search ............... 358/3.28, 358/1.9, 523, 1.18, 502, 521, 534, 1.14, 450; 235/487, 380, 488, 492, 441, 462.01; 382/100, 382/167, 203, 243, 296, 298, 319; 713/186; 347/15, 107
See application file for complete search history.

(56) References Cited

U.S. PATENT DOCUMENTS 7,383,999 B2 * 6/2008 Bi et al. ........................ 235/487

OTHER PUBLICATIONS

Bar codes and customer-specific data on billing or bank statements; The codes allow machines to sort the statements so that the correct statement is routed to the customer.
HP SmartStream Designer http://h10088.www1.hp.com/cda/gap/display/main/index.jsp?zn=gap&cp=20000-13698-16021-14402^89726_4041_100_.
Information is included on printed sheets outside the trim boundaries usually as either a 'slug' (aka slug line) or 'marks'. Slug lines usually contain job specific information (job name, number, etc), color patches for measurement and control, and other data. Marks are used for machine control or for operator reference. Machine control marks vary from simple collation marks (a 1×1 mm black square) for on-press sheeting to machine-readable barcodes for automated cutting or binding; these marks are specific to the output device, not to the printing device. Operator reference marks.

(Continued)

*Primary Examiner* — Charlotte M Baker
(74) *Attorney, Agent, or Firm* — Lloyd Dakin (57) ABSTRACT

A system and method is disclosed for embedding information in a printed media. The method discloses using a print production system to apply a first set of physical structures for carrying a first data stream onto a media; and using the print production system to apply a second set of physical structures which both carries a second data stream onto the media and also performs at least one other print production function. The system discloses a printing mechanism for applying a first set of physical structures modulated by a first data stream onto a media, thereby creating a printed media; and a coating mechanism for applying a second set of physical structures modulated by a second data stream onto the printed media, thereby creating a coated printed media.

26 Claims, 3 Drawing Sheets

OTHER PUBLICATIONS

Examples of the third solution include UV-visible ink on a CA Drivers License, UV-visible ink on credit cards, and UV-visible ink on Canadian currency. With the exception of the Canadian currency, all of these examples show the security use of UV-visible inks; UV ink on Canadian currency is also used to provide information for automated cutting and finishing (I could not find a citation on the web, but I saw it on the show How It's Made).
http://www.flickr.com/photos/tellumo/90141032/.
http://www.securisource.com/faq.html.
http://science.discovery.com/fansites/howitsmade/episode-guide/episode-guide.html.

* cited by examiner

SYSTEM AND METHOD FOR EMBEDDING INFORMATION IN A PRINTED MEDIA

BACKGROUND OF THE INVENTION

Field of the Invention

The present invention relates generally to systems and methods for coating printed media.

BRIEF DESCRIPTION OF THE DRAWINGS

Some embodiments of the invention are described, by way of example, with respect to the following figures.

DETAILED DESCRIPTION OF THE PREFERRED EMBODIMENT

Print production systems (including, ink-jet based printers, electro-photographic printers, conventional offset printers, conventional flexo-graphic printers and other digital or conventional printing processes) often require systems and methods for page routing, page quality assurance and other pro-duction information. Additionally such systems may also be called upon to perform various supply chain verification functions, for security uses, and for associating tracking, job, or cost information with printed pages generated by such systems.

Customers of such print production systems, however, often prefer not to be aware of all the manufacturing information and processes necessary for generating their printed media product. Striking a balance between the need for manufacturing information with the need for a polish printed media product for a customer is a challenging task.

One possible option for associating such print production information with print jobs is integrating such information into the content of the page itself. This method visually changes the look and nature of the content and is typically appropriate for only certain classes of printed material. The amount of data that this data channel could hold would be proportional to the printed area that it took from the actual content. Also, if one wanted to destroy this information, it would also risk the destruction of page content and, possibly leave aesthetically unpleasing mark.

Another solution is to print such information onto the border of printed page which then could be subsequently trimmed off. After the trimming step, there would be no effect on the printed content; however, this information would be carried along with the page up to the time before it was trimmed. After trimming, the data is literally cut out. Since the amount of data that this data channel could hold would be proportional to the printed area of the border, the capacity of data channel may be fairly limited for some prints with small borders, and might be nonexistent in others, such as edge-to-edge or borderless printing.

All of these approaches, however, are rather obtrusive or costly. The present invention addresses these issues less obtrusively and with minimal cost to the print production process. The present invention provides a system and method of expanding the functionality of print production systems (e.g. commercial printing presses) which already apply one or more coating layers to their printed media during various finishing processes.

Coating layers are typically applied to printed media (e.g. text, images, photos, etc.) to protect inks in the printed media from environmental effects (e.g. premature deterioration, and to ensure that high-value pages do not fade with time) or for aesthetic reasons (e.g. to use gloss, glass, or matte to enhance the entire sheet, or localized areas thereof). Coatings applied may vary from generally protective coatings, to Ultraviolet (UV) or Infrared (IR) protective coatings, as well as to glosses, varnishes of various types, and so on. Protective coatings are typically selected so that they do not interfere with the information already on the printed media (i.e. the coatings are preferably not visible under normal ambient lighting conditions).

A single coating layer is typically applied to the printed media using an analog process, such as "flooding", which currently indiscriminately covers the printed media with a uniform protective coat. The present invention alters this process by using a data stream to modulate a mixture of at least two different types of coatings applied to the printed media during the coating step. Such differential application of a coating to the printed media creates a new data channel for data streams such as those which control page routing, page quality assurance and other production information. Such a new data channel is also useful for enabling supply chain verification functions, for security uses, and for associating tracking, job, or cost information.

Since the protective coating used is preferably not visible under normal lighting, this new data channel also does not interfere with the information already on the printed media. Information can be added to this new data channel even if the underlying information on the printed media extends to the edges of the printed media. The media (i.e. substrate) is typically some sort of paper-based backing, but can alternatively be plastic, glass, metal, shrink wrap, or any other surface. Aesthetic coatings (gloss, glass, matte, etc) are visible under normal lighting, therefore this new data channel will be applied such that it does not interfere with or detract from the coating layer.

The information in this data channel could at a later step in the print production process be retrieved with a corresponding coating detector able to discriminate the two or more different coating types so that the data stream could be retrieved.

For example, in one embodiment of the present invention two different protective coatings can be used and then modulated in unison to provide full coverage protection on the printed media, while simultaneously writing a normally invisible two-tone, one-dimensional, or two-dimensional image on the page (e.g. each tone corresponding to the one of the protective coatings). Thus, to a user the page would look as if a normal coating was applied, but using a sufficiently discriminating sensor or under a preselected resonant light source, the otherwise normally invisible image on the page could be extracted.

One significant benefit of the present invention is that this new data channel is created without adding extra, and costly, print production steps. Also significant is that the data is applied to the printed media with a total volume of coating that is the same or almost the same for this invention as is currently required by systems and methods which just "flood" the printed media with just one type of coating. This enables the invention to be implemented at a very minimal cost since many printed media are already coated as a normal part of their manufacture.

Figure 1:
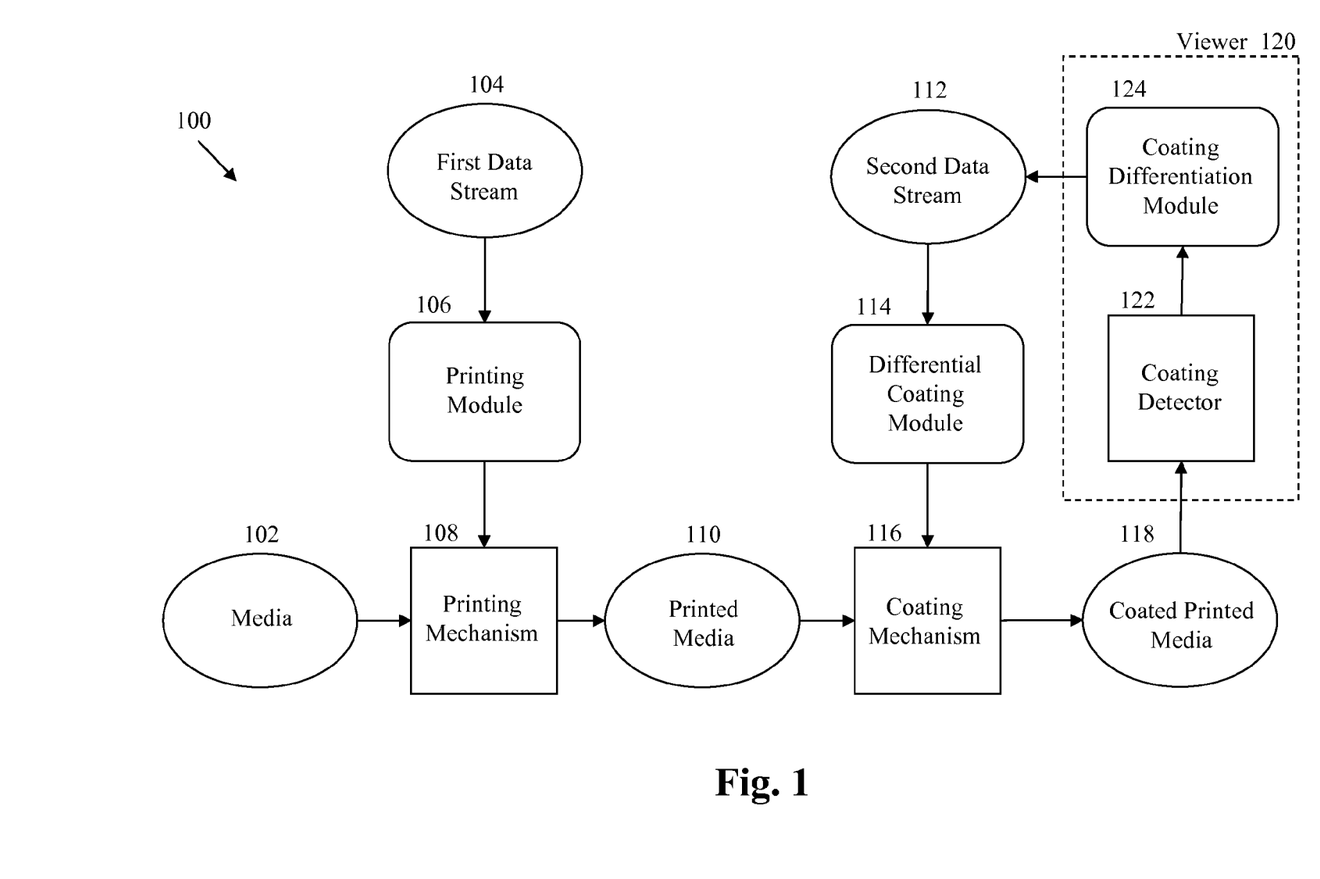
FIG. 1 is one embodiment of a system 100 for embedding information in a printed media.

FIG. 1 is one embodiment of a system 100 for embedding information in a printed media. FIG. 2 is a pictorial diagram 200 of one embodiment of a media 102 processed by the system 100. The media 102 shown in the diagram 200 is a product created by the print production processes of the system 100. To facilitate greater understanding of the present invention, both FIGS. 1 and 2 are discussed in parallel.

To begin, a first data stream 104, representing data such as text or images from another (not shown) application program, is sent to, or in an alternate embodiment requested by, a printing module 106. The printing module 106 translates the first data stream 104 into an predetermined format for application to the media 102.

Figure 2A:
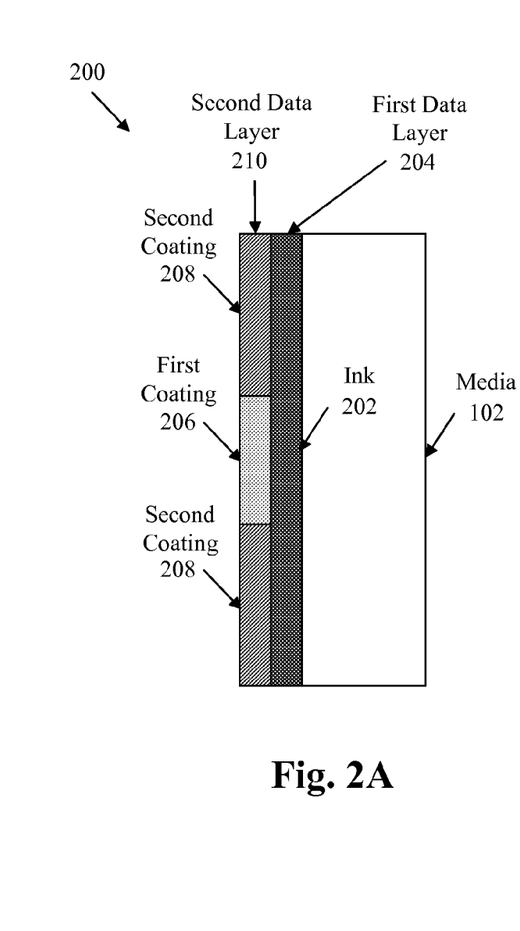
FIG. 2 is a pictorial diagram 200 of one embodiment of a media processed by the system 100.
Figure 2B:
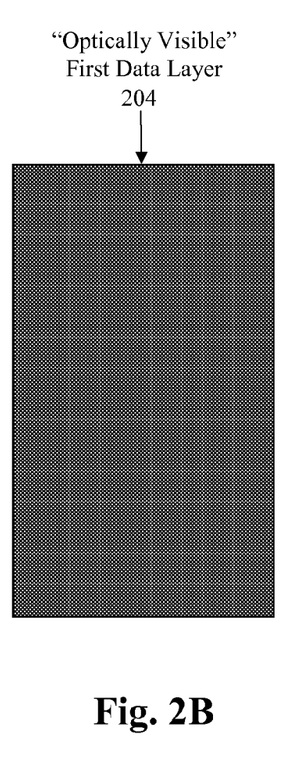
Figure 2C:
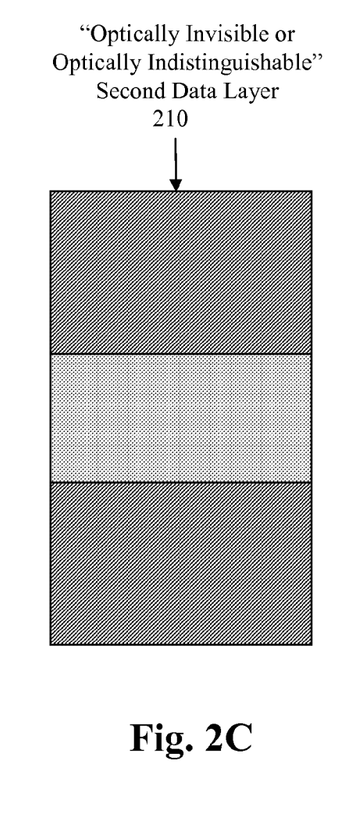

A printing mechanism 108, in accordance with commands from the printing module 106 applies the first data stream 104 to the media 102, thereby creating a printed media 110. Typically, and as shown in FIG. 2A, ink 202 is applied to the media 102 to create a first data layer 204 (e.g. first data channel). This first data layer 204 is preferably "optically visible".

"Optically visible" is herein defined a physical structure (e.g. the ink 202) which either reflects or transmits energy in a range of electromagnetic wavelengths that can be detected by a first data layer viewer (not shown). If the first data layer viewer is human, the "optically visible" range corresponds to a contiguous range of electromagnetic wavelengths between about 380 nm and 750 nm, which corresponds to a range of wavelengths which empirical data has determined that a typical human eye will be able to detect. If the first data layer viewer is a machine sensor of some sort, then the "optically visible" range corresponds to electromagnetic wavelengths for which the sensor is designed to detect, be they across a continuum of wavelengths or at certain discrete wavelengths.

In an example embodiment, text, symbols and/or images from the first data stream 104 are "RIP-ed" into a format that the printing mechanism 108 can directly apply with the ink 202 to the media 102 and which appear in the first data layer 204 as text, symbols and/or images on the printed media 110.

Next, a second data stream 112 is sent to, or in an alternate embodiment requested by, a differential coating module 114. The data in the second data stream 112 can also represent data such as text or images from an application program, likely to be one for print workflow control. The differential coating module 114 then translates the second data stream 112 into a predetermined format (e.g. symbols, barcodes, text, images, etc) for application to the printed media 110.

A coating mechanism 116, in accordance with commands from the differential coating module 114 applies the second data stream 112 to the printed media 110, thereby creating a coated printed media 118.

The differences between the "coatings" used to apply the second data stream 112 and "inks" used to apply the first data stream 104, as herein defined in the specification, are significant. One distinction is that "inks", as herein defined, have up until the teachings of the present invention only been used to convey information, whereas "coatings" as herein defined, have up until the teachings of the present invention, only been used to protect or aesthetically enhance the information conveyed by the "inks". Such inks could be optically visible or non-optically visible (e.g. UV visible only security inks). Other distinctions include that "coatings" are typically applied either "before or after" the information carrying inks are laid down in the printing process. For example, "pre-treatment coatings" could be used to enhance ink adhesion, whereas "post-treatment coatings" could be used for protective or aesthetic functions. Thus, the terms "ink" and "coating" as herein used to describe the present invention are different.

In one embodiment of the present invention, as shown in FIG. 2A, the coating mechanism 116 is programmed and designed to apply just two coatings (i.e. a first coating 206 and a second coating 208) over the ink 202 to create a second data layer 210 (e.g. second data channel). Note that in another embodiment of the present invention, the second data layer 210 coating can be applied to the media 102 first, as a primer or binding agent coating perhaps, and then the first data layer 204 with the ink 202 applied second, on top of the first and second coatings 206 and 208. Additionally another coating could be applied on top of the ink 202, forming a third data layer (not shown).

Regardless of an order in which the ink 202 and the coatings 206 and 208 are applied, the only preferred constraint is that the ink and the coatings should not interfere with the information carrying capabilities of each data layer. Of course, in an alternate embodiment, some information interference may be acceptable.

The first and second coatings 206 and 208 used to create the second data layer 210 are preferably either "optically invisible" or, in an alternate embodiment, "optically indistinguishable".

"Optically invisible" is herein defined a physical structure (e.g. the first and second coatings 206 and 208) which either reflects or transmits energy in a range of electromagnetic wavelengths that can be detected by a coating viewer 120, but not by the first data layer viewer (discussed above). If the first data layer viewer is human, the "optically invisible" range corresponds to those electromagnetic wavelengths less than about 380 nm (e.g. in the ultraviolet light range and shorter) or greater than about 750 nm (e.g. in the infrared light range and longer), which corresponds to a range of wavelengths which empirical data has determined that a typical human eye will not be able to detect. If the first data layer viewer is a machine sensor of some sort, then the "optically invisible" range corresponds to electromagnetic wavelengths for which the sensor is either not designed to detect or for which the sensor is designed to ignore.

"Optically indistinguishable" (or alternatively "optically similar") is herein defined as two or more physical structures (e.g. the first and second coatings 206 and 208) which either reflects or transmits energy in a range of electromagnetic wavelengths which can not be differentiated (i.e. distinguished) by the first data layer viewer, but which can be differentiated (i.e. distinguished) by the coating viewer 120, and which still permits the first data layer viewer to detect the first data stream 104 in the first data layer 204.

If the first data layer viewer is human, an "optically indistinguishable" range can be empirically identified without undue experimentation using existing techniques and studies on human perceptible "shades of grey", with the overall preference being that wavelength differences between the coatings are either minimally-detectable or completely undetectable by the human viewer under normal (i.e. intended) coated printed media 118 viewing conditions. If, however, the first data layer viewer is a machine sensor of some sort, then the "optically indistinguishable" range corresponds to electromagnetic wavelength differences for which the sensor is either not designed to resolve or for which the sensor is designed to ignore.

Note that a differential between each coating's resonant electromagnetic wavelength can be greater if the coating's resonant electromagnetic wavelength are "optically invisible" than they can be if the coating's resonant electromagnetic wavelength are "optically visible" but need to be "optically indistinguishable". One example of two "optically visible" but "optically indistinguishable" coatings could be two different "gloss" coats, each slightly varying in glossiness.

In a preferred embodiment, the first coating 206 and second coating 208 are "clear" coatings which permit viewing of the first data layer 204 under normal light, but which are designed to block ultraviolet (UV) light.

The coating mechanism 116 can be designed and programmed to apply the two coatings 206 and 208 to the printed media 110 to create the coated printed media 118 in a variety of ways. To enable such flexibility, the normal single-formula in-line coating mechanisms used in current print production systems is replaced with an addressable two or more formula coating mechanism (e.g. a print bar or head).

In a first embodiment, the coating mechanism 116 is part of a high speed digital press and uses a digital marking technology to spray the first and second coatings 206 and 208 onto one or more "transfer mechanisms" (e.g. plates, blankets, etc.) before finally being deposited on the printed media 110. Digital marking technologies include: inkjet technology, LEP, Xerography, as well as many others. Any digital marking technology is valid for this invention.

In a second embodiment, the coating mechanism 116 uses digital marking technology to spray the first coatings 206 onto a "transfer mechanism" and then an analog marking technology to apply the second coating 208 onto the "transfer mechanism" before both coatings are finally moved from the "transfer mechanism" to the printed media 110. Analog marking technologies, such as "flooding", still permit some information to be encoded into a coating, however such information would typically be the same for each page in a production run. Digital marking technologies, such as inkjet, however, allow the information applied to each page to vary, page by page during a production run.

In a third embodiment, the coating mechanism 116 covers the "transfer mechanism" with a second data stream 112 modulated "blend" of the first and second coatings 206 and 208. The blend can be any percentage combination of the first and second coatings 206 and 208. This "blended" coating is then continually applied to the "transfer mechanism" before the coating blend is applied to the printed media 110.

Those skilled in the art will recognize that in other embodiments of the present invention there need not be abrupt boundaries between the first and second coatings 206 and 208 as shown in FIG. 2A, but that either there can be a "transition region" consisting of a temporary mixture of the two coatings. Also in alternate embodiments, the coatings 206 and 208 need not cover the entire printed media 110.

In yet other embodiments, the second data layer 210 can be creating by using more three or more coatings. Also, additional data layers (not shown) such as a third, fourth, fifth, etc. data layer could be stacked on top of the second data layer 210 to create addition data channels.

Next the coating is cured using a standard curing methods, and the coated printed media 118 moves to any subsequent print production steps to continue enhancing and/or finishing the coated printed media 118.

Note that the first and second data stream formats encoded into the first and second data layers 204 and 210 are likely to be very different due to their differing purposes. The former for displaying the first data layer 204 (see FIG. 2B) so it is "optically visible" to the first data layer viewer (typically a human), and the latter for implementing some form of print production control using the "optically invisible" or "optically indistinguishable" second data layer 210 (see FIG. 2C) which is read by the coating viewer 120 (typically a machine).

The second data stream 112 can be detected in the second data layer 210 using the coating viewer 120. The coating viewer 120 includes a coating detector 122 and a coating differentiation module 124. The coating detector 122 scans the coated printed media 118 and differentiates the first and second coatings 206 and 208. The coating differentiation module 124 then interprets and demodulates the signals from the coating detector 122 thereby regenerating the second data stream 112.

While in a preferred embodiment, the coating viewer 120 is completely machine implemented, there are alternate embodiments (not shown) where the coating viewer 120 can instead include an energy source that irradiates the coated printed media 118 in such a was as to translate the resonant electromagnetic frequencies of the first and second coatings 206 and 208, such that a human viewer could see the second data stream 112. For example, the coated printed media 118 could be exposed to a "UV-light" which thereby causes UV-based first and second coatings 206 and 208 to become "optically visible" to the human viewer. Similarly for IR-based coatings illuminated with IR-light.

Figure 3:
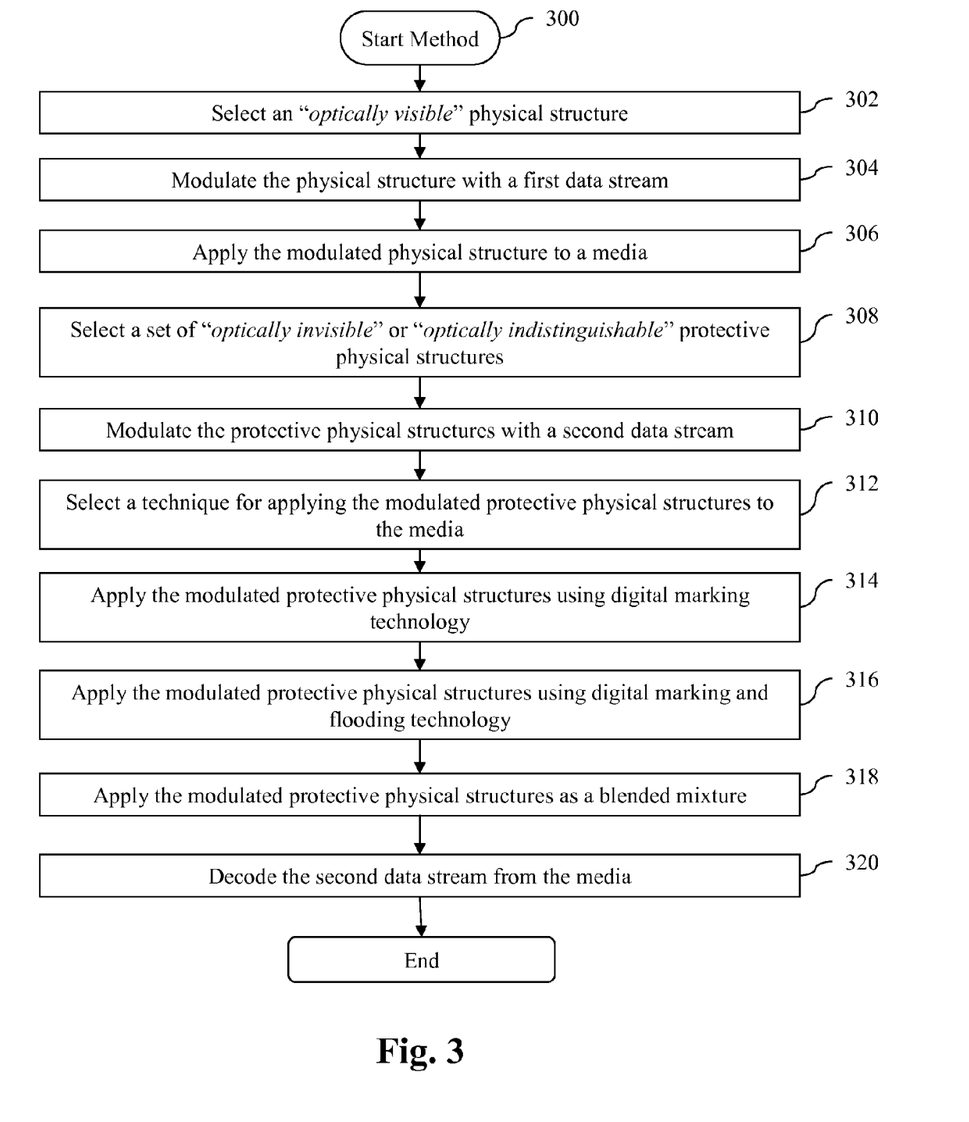
FIG. 3 is a flowchart of one embodiment of a method 300 for embedding information in a printed media.

FIG. 3 is a flowchart of one embodiment of a method 300 for embedding information in a printed media. Those skilled in the art will recognize that while one embodiment of the present invention's method is now discussed, the material in this specification can be combined in a variety of ways to yield other embodiments as well. The method steps next discussed are to be understood within a context provided by this and other portions of this detailed description.

The method 300 begins in step 302, where an "optically visible" physical structure (e.g. ink 202) is selected. Next, in step 304, the physical structure is modulated to carry the first data stream 104. In step 306, the modulated physical structure is applied to the media 102 by the printing mechanism 108, thereby creating the printed media 110.

In step 308, at least a set of two "optically invisible" or an "optically indistinguishable" protective physical structures (e.g. coatings 206 and 208) are selected. Then in step 310, the protective physical structures are modulated to carry the second data stream 112.

In step 312, the differential coating module 114 selects one of the three following techniques for applying the second data stream 112 modulated physical structures to the printed media 110.

In embodiments of the present invention where the physical structures modulated by the second data stream 112 are applied to the media 102 "after" the physical structure modulated by the first data stream 104 is applied, the physical structures modulated by the second data stream 112 preferably also act as protective or aesthetic coatings.

However, in other embodiments of the present invention where the physical structures modulated by the second data stream 112 are applied to the media 102 "before" the physical structure modulated by the first data stream 104 is applied, the physical structures modulated by the second data stream 112 preferably also act as primer or binding agent coatings.

When using a first technique, in step 314, the protective physical structures are both applied by the coating mechanism 116 to the printed media 110 using digital marking technology, thereby creating the coated printed media 118. When using a second technique, in step 316, one of the protective physical structures is applied by the coating mechanism 116 to the printed media 110 using digital marking technology, but the other protective physical structure is applied by a flooding technique to create the coated printed media 118. When using a third technique, in step 318, a blended mixture of the protective physical structures is applied by the coating mechanism 116 to the printed media 110 to create the coated printed media 118.

Next in step 320, the coating viewer 120 decodes the second data stream 112 from the coated printed media 118.

Instructions of software described above are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A method for embedding information on printed media, comprising:
    using a print production system to apply a first set of physical structures for carrying a first data stream onto a media; and
    using the print production system to apply a second set of physical structures, the second set having a first coating and a second coating, which both carries a second data stream onto the media and also performs at least one other print production function from a group including:
    protecting the first set of physical structures;
    aesthetically enhancing the first set of physical structures;
    serving as a primer for the first set of physical structures; and
    serving as a binding agent for the first set of physical structures.

2. The method of claim 1, wherein:
    the first set of physical structures are "optically visible"; and
    the second set of physical structures are "optically invisible".

3. The method of claim 2:
    wherein the first set of physical structures reflect at least one electromagnetic wavelength in a group of wavelengths between 380 nm and 750 nm; and
    wherein the second set of physical structures reflect at least one electromagnetic wavelength in a group of wavelengths including: wavelengths shorter than 380 nm and wavelengths longer than 750 nm.

4. The method of claim 1:
    wherein the media is one from a group including: a page of paper, a paper-based media, plastic, glass, metal, and shrink wrap.

5. The method of claim 1:
    wherein the second data stream represents one from a group including: print workflow control information, page routing information, quality assurance information, supply chain verification information, security information, print production tracking, job, and cost information.

6. The method of claim 1:
    wherein the coatings are one from a group including: ultraviolet, infrared, gloss, glass, matte, and varnish.

7. The method of claim 1, wherein applying the second set of physical structures includes:
    applying both coatings using digital marking technology.

8. The method of claim 1, wherein applying the second set of physical structures includes:
    applying one coating using a digital marking technology; and
    applying another coating using an analog marking technology.

9. The method of claim 1, wherein applying the second set of physical structures includes:
    blending the coatings to form a blended coating; and
    after the blending, applying the blended coatings onto the media.

10. The method of claim 9, comprising:
    modulating the blending according to the second data stream.

11. The method of claim 1, further comprising
    detecting the second data stream in the second set of physical structures by differentiating the first and second coatings.

12. The method of claim 11, comprising:
    using the detected data stream to control the print production system.

13. The method of claim 1:
    the first set of physical structures are "optically visible"; and
    the second set of physical structures are "optically indistinguishable".

14. The method of claim 13:
    wherein the first set of physical structures reflect at least one electromagnetic wavelength in a group of wavelengths between 380 nm and 750 nm; and
    wherein the second set of physical structures reflect at least two proximate electromagnetic wavelengths in a group of wavelengths between 380 nm and 750 nm.

15. The method of claim 13:
    wherein the first set of physical structures reflect at least one electromagnetic wavelength in a group of wavelengths between 380 nm and 750 nm; and
    wherein the second set of physical structures reflect at least two electromagnetic wavelengths in a group of wavelengths less than about 380 nm and greater than about 750 nm which a human viewer can not resolve.

16. The method of claim 1, comprising:
    applying the first coating and the second coating to substantially different areas of the media to form a coating layer of substantially uniform thickness on the printed media.

17. The method of claim 16, comprising:
applying the coating layer to cover substantially the entire printed media.

18. The method of claim 16, comprising:
modulating the application of the first coating and the second coating according to the second data stream.

19. The method of claim 18, comprising:
wherein the modulating produces an optically invisible two-tone image in the second set of physical structures.

20. An article comprising at least one non-transitory computer-readable storage medium containing computer instructions for:
using a print production system to create a first data layer, on a media, with ink modulated by a first data stream; and
using the print production system to create a second data layer, juxtaposed proximate to the first data layer, with at least two coatings modulated by a second data stream; and
wherein the second data layer also performs at least one other print production function from a group including:
protecting the first data layer;
aesthetically enhancing the first data layer;
serving as a primer for the first data layer; and
serving as a binding agent for the first data layer.

21. The instructions of claim 20, further including:
selecting the ink so that the first data layer is "optically visible"; and
selecting the coatings so that the second data layer is "optically invisible".

22. The instructions of claim 20, further including:
selecting the ink so that the first data layer is "optically visible"; and
selecting the coatings so that the second data layer is "optically indistinguishable".

23. The instructions of claim 20, further including:
selecting the coatings so that the second data layer protects the first data layer from one from a group including: premature deterioration, fading, ultraviolet light, and infrared light.

24. A system for embedding information on printed media, comprising:
a printing mechanism, within a print production system, for applying a first set of physical structures modulated by a first data stream onto a media, thereby creating a printed media; and
a coating mechanism, within the print production system, for applying a second set of physical structures modulated by a second data stream onto the printed media, thereby creating a coated printed media, the second set of physical structures including a first coating and a second coating; and
wherein the second set of physical structures also perform at least one other print production function from a group including:
protecting the first set of physical structures;
aesthetically enhancing the first set of physical structures;
serving as a primer for the first set of physical structures; and
serving as a binding agent for the first set of physical structures.

25. The system of claim 24, wherein:
the printing mechanism applies "optically visible" physical structures; and
coating mechanism applies "optically invisible" physical structures.

26. The system of claim 24, wherein:
the printing mechanism applies "optically visible" physical structures; and
coating mechanism applies "optically indistinguishable" physical structures.

* * * * *

UNITED STATES PATENT AND TRADEMARK OFFICE
CERTIFICATE OF CORRECTION

PATENT NO.        : 8,325,388 B2                                    Page 1 of 1
APPLICATION NO.   : 12/475442
DATED             : December 4, 2012
INVENTOR(S)       : I-Jong Lin et al.

It is certified that error appears in the above-identified patent and that said Letters Patent is hereby corrected as shown below:

In column 8, line 31, in Claim 9, delete "blended coatings" and insert --blended coating--, therefor.

Signed and Sealed this
Nineteenth Day of March, 2013

Teresa Stanek Rea
*Acting Director of the United States Patent and Trademark Office*